United States Patent [19]

Webber et al.

[11] 3,906,813
[45] Sept. 23, 1975

[54] SHIFT CONTROL MECHANISM FOR TRANSMISSIONS

[75] Inventors: Philip S. Webber, Morton; Maurice F. Franz, East Peoria; Kenneth R. Moline, Peoria, all of Ill.

[73] Assignee: Caterpillar Tractor Company, Peoria, Ill.

[22] Filed: June 21, 1973

[21] Appl. No.: 372,331

[52] U.S. Cl. ............................. 74/473 R; 137/636.2
[51] Int. Cl.² ......................................... B60K 20/00
[58] Field of Search .......... 74/335, 753, 527, 473 R, 74/340, 364; 137/636, 636.1, 625.11, 624.18, 624.27, 636.2

[56] References Cited
UNITED STATES PATENTS

| | | | |
|---|---|---|---|
| 1,756,845 | 4/1930 | Aufuldish ........................... | 137/636 |
| 1,822,117 | 9/1931 | Travis ............................ | 137/636 X |
| 3,339,461 | 9/1967 | Sommerer .................. | 137/624.18 X |
| 3,550,478 | 12/1970 | Bechman et al. ............. | 74/473 R X |
| 3,667,309 | 6/1972 | Franz et al............................ | 74/340 |
| 3,742,971 | 7/1973 | Worthington.............. | 137/624.27 X |

*Primary Examiner*—Samuel Scott
*Assistant Examiner*—Frank H. McKenzie, Jr.
*Attorney, Agent, or Firm*—Phillips, Moore, Weissenberger Lempio & Strabala

[57] ABSTRACT

A manually operable shift control mechanism associated with a transmission control circuit which is responsive to fluid pressure for selectively establishing one of a plurality of speed ratios in a transmission, the control mechanism including a pivoted lever angularly movable between successively arranged positions for establishing one of the speed ratios in the transmission and an actuating plate arranged for rotation with the lever and having arcuate portions respectively interacting with a plurality of valves to condition the transmission control circuit for selectively establishing one of the speed ratios and for accomplishing various other control functions for the transmission.

4 Claims, 15 Drawing Figures

FIG.1

Fig_5_

Fig_13_

SHIFT CONTROL MECHANISM FOR TRANSMISSIONS

BACKGROUND OF THE INVENTION

The present invention relates to a manually operable shift control mechanism for a transmission and more particularly to such a control mechanism including manually rotatable means interacting with a plurality of valve means which are in fluid communication with a transmission control circuit.

A transmission of the type contemplated for regulation by the shift control mechanism of the present invention is described, for example, in U.S. Pat. No. 3,667,309 issued June 16, 1972 and assigned to the assignee of the present invention. The transmission of that patent is adaptable for use in various vehicles, particularly earth moving or material handling vehicles requiring a transmission with a relatively large number of gears or speed ratios to assure proper operation under widely varying conditions. The transmission is preferably regulated by a control circuit which, in turn, is operable by a manual shift control mechanism of the type provided by the present invention.

Within such a transmission control circuit, it is necessary to provide for regulation over a number of functions within the transmission in response to movement of the manual shift control mechanism. Accordingly, it is desirable to provide a reliable and relatively simple interconnection between the manual shift control mechanism and the control circuit for the transmission.

SUMMARY OF THE INVENTION

It is therefore an object of the present invention to provide a manually operable shift control mechanism of the type including a single control element which is angularly movable relative to a housing for accomplishing a number of functions within the transmission.

It is a more particular object of the present invention to provide such a manual shift control mechanism wherein angular movement of the lever actuates a plurality of valves in selected combinations to establish one of a plurality of speed ratios in the transmission.

It is a further object of the invention to provide such a manually operable shift control mechanism wherein various safety functions are also accomplished to assure proper operation of the transmission.

It is a still further object of the present invention to provide such a manually operable shift control mechanism which is of reliable and relatively simple construction.

Still other objects and advantages of the present invention are made apparent in the following description having reference to the accompanying drawings.

DESCRIPTION OF A PREFERRED EMBODIMENT

Figure 1:
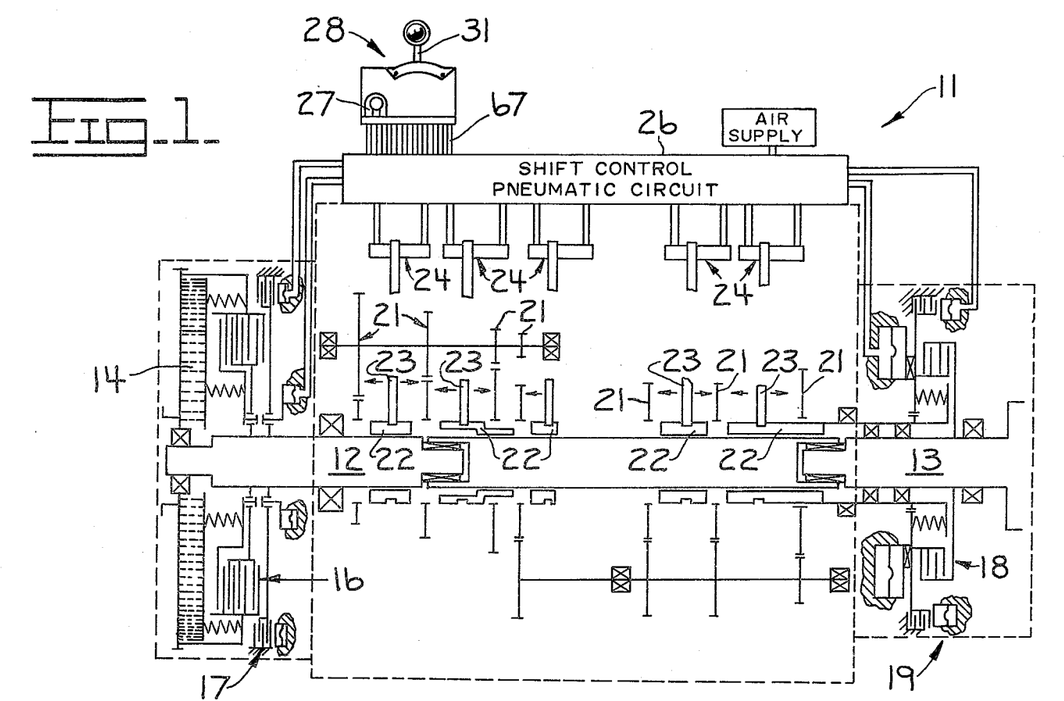
FIG. 1 is a generally schematic representation, with parts in section, of a vehicle transmission suitable for regulation by the manual shift control mechanism of the present invention.

A transmission of a type suitable for regulation by the shift control mechanism of the present invention is schematically represented in FIG. 1. Referring to that Figure, the transmission is generally indicated at 11 with an input shaft 12 and an output drive shaft 13. Rotation of the input shaft 12 relative to the flywheel 14 of an engine or prime mover (not otherwise shown) is regulated by an input clutch 16 and an input brake 17. Similarly, an output clutch 18 and an output brake 19 are associated with the output drive shaft 13. The manner in which these components cooperate with the transmission 11 to provide locomotive power for a vehicle is described in greater detail, for example, in U.S. Pat. No. 3,667,309 as noted above.

Figure 2:
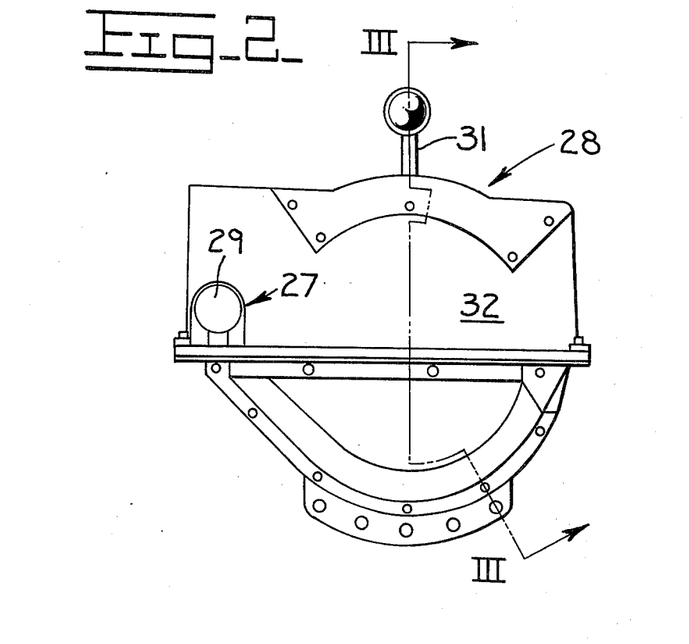
FIG. 2 is a side view in elevation of a manual shift control mechanism embodying the present invention.

The transmission 11 includes a plurality of gear trains 21 which may be interconnected to form a variety of power paths through the transmission 11 by shifting clutch collars 22 in order to provide a relatively large number of possible speed ratios in the transmission. Each of the clutch collars 22 is positioned by an associated shifting fork 23. The forks 23 are in turn operated by respective motor means or fluid cylinders 24. The cylinders 24 are selectively actuated by fluid under pressure from a fluid shift control circuit indicated at 26 to establish one of the speed ratios within the transmission 11. A fluid operated shift control circuit of the type indicated at 26 is illustrated and described in greater detail, for example, in U.S. Pat. No. 3,667,309. For purposes of the present invention, it is noted that the control circuit 26 is preferably adapted for pneumatic operation with air under pressure being introduced to the control circuit 26 by a transmission air control valve 27 which is illustrated in FIG. 2 together with a manual shift control mechanism 28. The control circuit 26 is particularly adapted for operation by a minimum air pressure of, for example, approximately 65 psi. The valve 27 is preferably actuated by a push button 29, the push button tending to be released in order to deactuate the valve unless the minimum supply pressure of 65 psi is available.

The manual shift control mechanism 28 of FIG. 2 includes an angularly movable manual shift control lever 31. The construction and manner of operation for the manual shift control mechanism 28 in selectively establishing one of a plurality of speed ratios in the transmission as well as regulating other functions within the transmission is described in greater detail below.

Figure 3:
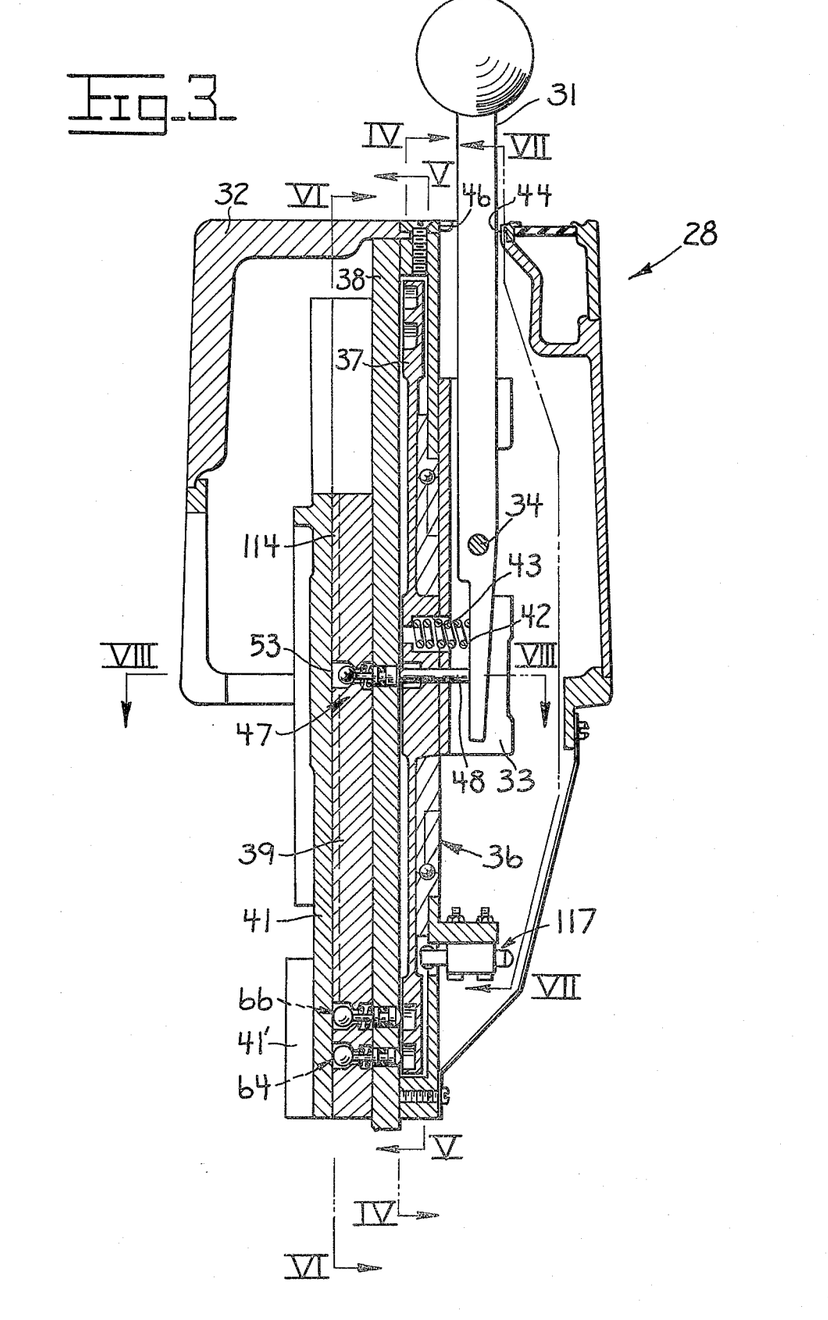
FIG. 3 is a view of the manual shift control mechanism taken along Section III—III of FIG. 2.

Referring particularly to FIG. 3, the manual shift control mechanism 28 includes a fabricated housing 32. The lever 31 is pivotably supported for lateral movement upon a member or lever base 33 by means of a pin 34. The lever base 33 together with the lever 31 is supported for pivotable or angular movement relative to the housing 32 by means of a bearing assembly 36.

An actuating cam plate 37 is secured for angular movement or rotation with the lever 31 and lever base 33. Constructional details of the actuating cam plate 37 are better illustrated in FIGS. 4 and 5 as described in greater detail below. However, the general function of the actuating cam plate 37 is to selectively actuate a plurality of valves supported in fixed relation in the housing 32 by plate numbers 38 and 39. A plurality of air passages formed upon a surface of the plate 39 are arranged for communication with the various valves (See FIGS. 3 and 6), the air passages being closed by cover plates 41 and 41'.

The lever 31 is normally urged laterally in a counterclockwise direction as viewed in FIG. 3 by means of a spring 42 arranged in an opening 43 formed by the actuating cam plate 37 and the lever support base 33. The lever 31 is of course angularly movable through an elongated opening 44 formed by the housing 32. A serrated gate 46 is formed along one side of the opening 44 by the housing 32 so that the lever 31 tends to be engaged with one of the serrations by the spring 42. The angular spacing of the serrations in the gate portion 46 correlate with positions of the lever 31 for establishing various speed ratio settings in the transmission 11 through the control circuit 26 (see FIG. 1). The particular angular spacing between these settings is described in greater detail below in connection with FIG. 4. As illustrated in FIG. 3, the lever 31 may be rotated in a clockwise direction against the spring 42 and out of engagement with the serrated gate 46. As the lever 31 is rotated in this fashion, an initiating valve 47 is actuated by the lever as a preliminary step to a change of speed ratio settings in the transmission of FIG. 1.

Figure 8:
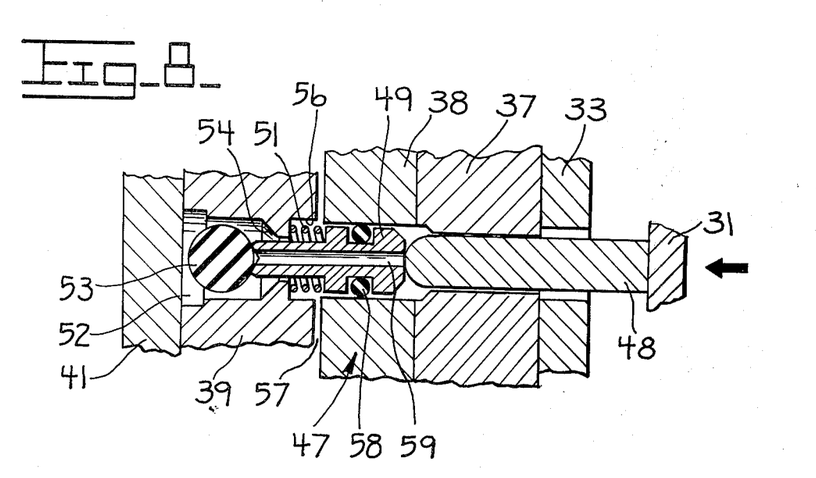
FIG. 8 is a fragmentary view taken along Section Line VIII—VIII in FIG. 3 to more clearly illustrate interaction of a shift control lever in the manual control mechanism with a centrally arranged initiating valve.

The initiating valve 47 is also illustrated in FIG. 8. The valve 47 includes a plunger 48 extending through the actuating cam plate 37 and the lever base 33 for engagement with the lever 31. A valve member 49 is urged rightwardly against the plunger 48 as viewed in FIG. 8 by means of a spring 51 as well as air pressure in a ball chamber 52. A ball 53 arranged in the chamber 52 is normally seated on a chamber face 54 in order to close the chamber 52. However, as the plunger 48 and valve member 49 are urged leftwardly by the lever 31 into the position illustrated in FIG. 8, the ball 53 is unseated from the surface 54 so that air pressure from the chamber 52 is communicated through a spring chamber 56 containing the spring 51 to a passage 57 formed between the plate members 38 and 39. This air pressure is employed for the initiation of the transient mode in transmission control 26 as described in greater detail below. When the lever 31 is again engaged with the serrated gate 46 by the spring 42 (see FIG. 3), the plunger 48 and valve member 49 are shifted rightwardly by the spring 51 so that the ball 53 again seats upon the surface 54 under the influence of air pressure in the chamber 52. With the spring chamber 56 being closed by a seal 58, air pressure in the chamber 56 as well as in the passage 57 is then allowed to escape through an axial passage 59 in the valve stem 49.

Figure 6:
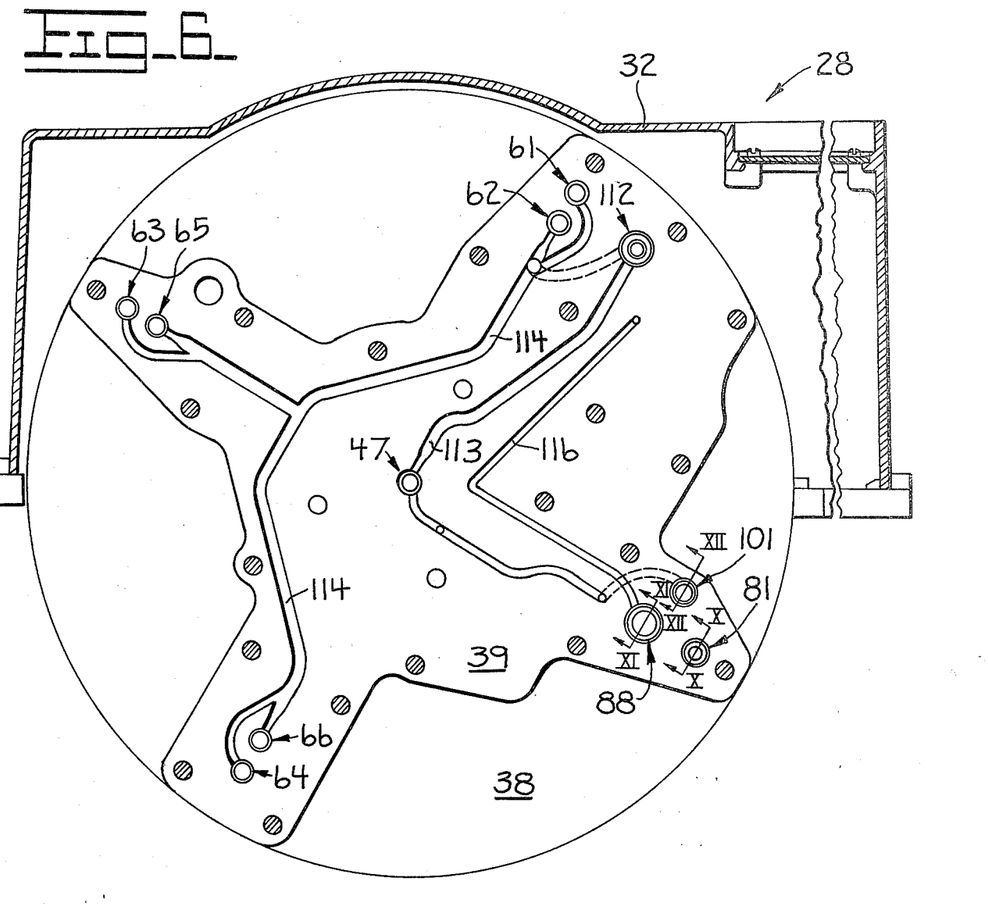

Referring to FIGS. 3 and 6, pilot valves operable in selected combinations for establishing one of a plurality of speed ratios in the transmission 11 (see FIG. 1) are mounted within the plate members 38 and 39. These pilot valves are indicated respectively at 61, 62, 63, 64, 65 and 66. The pilot valves are of substantially the same construction as the valve 47 in FIG. 8 except that the valves 61–66 are actuated by respective arcuate portions of the actuating cam plate 37 to communicate air pressure through respective conduits indicated generally at 67 in FIG. 1 to perform respective functions within the transmission control circuit 26 as described below. The valves 61–64 operate the cylinders 24 (see FIG. 1) in various pre-selected combinations to establish a plurality of speed ratios within the transmission 11. Within the particular transmission illustrated in FIG. 1, the cylinders 24 operated by the valves 61–64 are operable to provide 16 forward speed ratios. The pilot valve 65 is actuated to condition the transmission 11 for reverse operation while the pilot valve 66 is actuated to establish a neutral condition in the transmission.

Figures 4, 9, 14, 15:
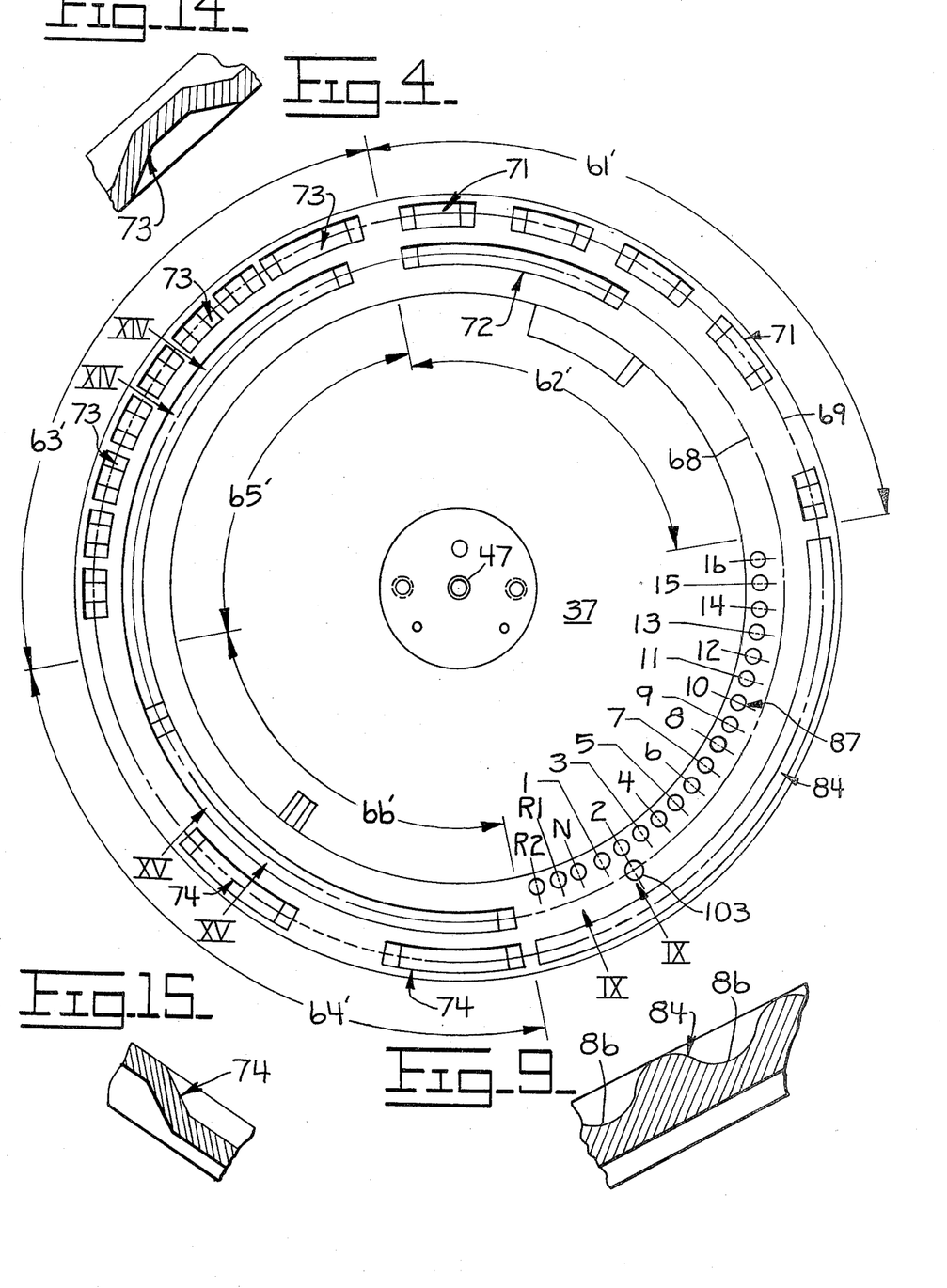
FIGS. 4, 5, 6 and 7 are substantially full-length sectioned views taken through the shift control mechanism of FIG. 3 along Section Lines IV—IV, V—V, VI—VI and VII—VII, respectively.
FIG. 9 is a fragmentary view taken along Section Line IX—IX of FIG. 4 to illustrate a portion of a corrugated detent surface.
FIGS. 14 and 15 are sectioned views taken respectively along Section Line XIV—XIV and XV—XV of FIG. 4.

Referring also to FIG. 4, interaction of the pilot valves 61–66 with respective arcuate portions of the actuating cam plate 37 is effected through a plurality of ramps or surface variations arranged along inner and outer diameters 68 and 69 on the actuating cam plate 37. Correlating the arrangement of the pilot valves 61–66 in FIG. 6 with the surface configuration of the actuating cam plate as illustrated in FIG. 4, it may be seen that the pilot valve 61 is selectively actuated by a plurality of ramps 71 formed along the outer diameter 69 within an arcuate portion of the cam plate 37 as indicated at 61'. The valve 62 is selectively actuated by means of an elongated ramp 72 formed along the inner diameter 68 within an arcuate portion of the actuating cam plate 37 as indicated at 62'. The pilot valve 63 is similarly actuated by a plurality of ramps 73 arranged along the outer diameter 69 of the actuating cam plate 37 within an arcuate portion indicated at 63'. The pilot valve 64 is actuated by ramps 74 arranged along the outer diameter 69 within an arcuate portion 64' of the actuating cam plate. The pilot valve 65 and the pilot valve 66 are respectively actuated by cam surfaces arranged along the inner diameter 68 within respective arcuate portions of the actuating cam plate 37 as indicated at 65' and 66' respectively.

Configuration of the various ramps formed upon the surface of the actuating cam plate 37 may be better seen with reference to FIGS. 14 and 15. Those figures respectively illustrate, in cross section, ramp surfaces formed within the arcuate portions 63' and 64' of the actuating cam plate 37.

Figure 10:
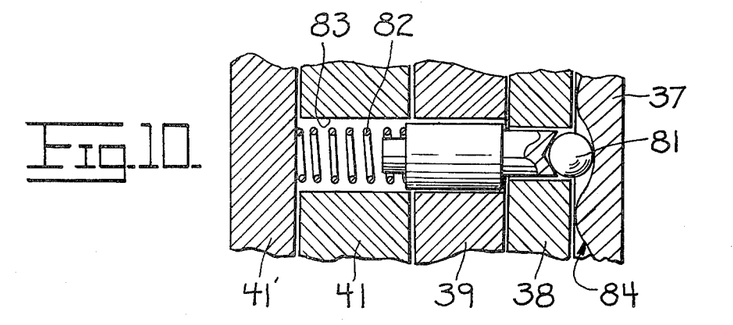
FIG. 10 is a view taken along Section X—X of FIG. 6 to illustrate a detent mechanism which cooperates with the surface of FIG. 9.
Figure 11:
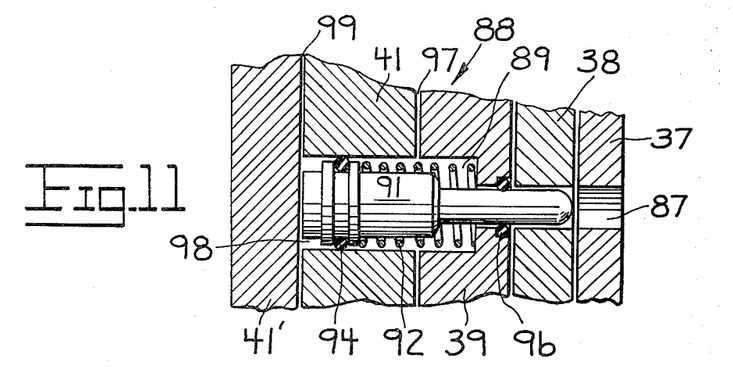
FIG. 11 is a view taken along Section Line XI—XI to illustrate a locking mechanism for preventing movement of the manual control to a new speed ratio position when the transmission is in a transient condition of operation.
Figure 12:
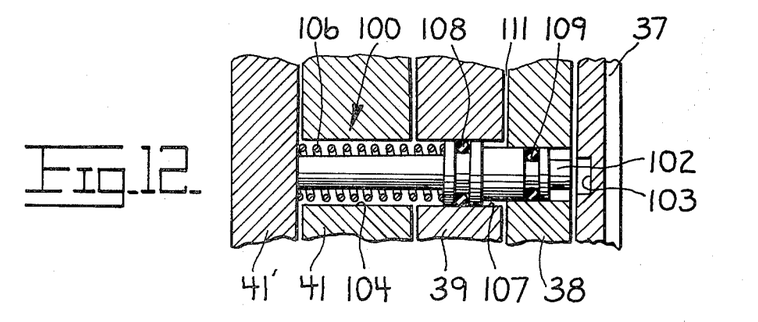
FIG. 12 is a view taken along Section XII—XII in FIG. 6 to illustrate another locking mechanism for maintaining the manual control lever in a neutral position until the transmission control circuit is properly conditioned for operation.

The actuating cam plate 37 has additional surface features which cooperate with components illustrated in FIG. 6 as well as in FIGS. 10–12. For example, a detent mechanism tending to establish angular alignment of the actuating cam plate 37 and the lever 31 so that the pilot valves 61–66 are properly positioned for a selected speed ratio in the transmission 11 of FIG. 1 is illustrated in FIGS. 4, 9, and 10. Referring to FIG. 10, a detent ball 81 is acted upon by a spring 82 which tends to urge it out of an opening 83 formed by the plates 39 and 41 for engagement with a corrugated detent surface 84 which is illustrated in FIG. 4 and shown in section by FIG. 9. The depressions 86 in the corrugated detent surface correspond with the serrations of the gate 46 and the position of the arcuate cam plate 37 and lever 31 for conditioning the pilot valve 61–66 to initiate the various speed ratios in the transmission of FIG. 1.

Indexing holes corresponding to each of the speed ratios are indicated at 87 with corresponding numerical and letter labels indicating the particular speed and directional setting of the transmission for each of the holes. A locking device indicated at 88 in FIG. 11 cooperates with the indexing holes 87 to prevent angular movement of the lever 31 during a transient condition in the transmission of FIG. 1. The locking device 88 is arranged in a chamber 89 formed by the plates 39 and 41. A spring-loaded plunger 91 is normally retracted by a spring 92 arranged within a chamber 89. The chamber 89 is closed by seals 94 and 96. The chamber 98 is is communication with outlet pressure from the air supply valve 27 (see FIGS. 1 and 2) by means of a passage 99 formed between the plates 41 and 41'. Chamber 89 is subject to pressurization by air entering through a passage 97, formed between the plates 39 and 41, from the shift control circuit 26 (see FIG. 1).

The chamber 98 when pressurized has sufficient force to overcome the force of spring 92 and will move plunger 91 to the right in FIG. 11 and, hence, engage one of holes 87. When plunger 91 is in a hole 87 the cam plate 37 is prevented from rotating and selecting a new ratio. The timing of the pressurization and depressurization of chamber 89 is controlled by the control circuit 26. The cam 37 is prevented from rotating when the transmission 11 is in its transient mode. When transmission 11 has completed a transient mode, plunger 91 is withdrawn by pressurizing chamber 89 via passage 97, FIGS. 6 and 11.

FIG. 12 illustrates a neutral locking device 100 including a plunger 102 arranged for engagement with a hole 103 in the cam actuating plate (see FIG. 4) to prevent movement of the lever 31 out of a neutral position until air is supplied to the transmission control circuit 26 of FIG. 1 from the air supply valve 27.

To accomplish this purpose, the plunger 102 is arranged within a chamber 104 formed by the plate members 39 and 41. Spring 106 urge the plunger 102 rightwardly as viewed in FIG. 12 for engagement with the hole 103 (see FIG. 4) when the actuating cam plate and the lever 31 are positioned in neutral. A portion 107 of the chamber 104 is closed by seals 108 and 109 while being arranged to receive air pressure from the supply valve 27 through a passage 111. Air pressure in the chamber 107 urges the plunger leftwardly against the spring 106. Accordingly, when air is being supplied to the control circuit 26 by the valve 27, air pressure in the chamber 107 retains the plunger 102 in a retracted or leftward position, as illustrated in FIG. 12, to permit rotation of the actuating cam plate 37 and control lever 31.

Referring again to FIG. 6, the plate 39 also includes passage means for communicating air to the various valve mechanisms arranged in the plate members 38, 39 and 41. Most of the passages are formed upon a surface of the plate member 39 and are closed by the cover plates 38 and 41 (see FIG. 3).

Air under pressure is supplied to passage 113 from an adjacent cover 41. This pressurized air is supplied to initiation valve 47 and supply valve 112. Air from valve 112 is supplied to passage 114 and hence pilot valves 61–66 via hidden passage 115 during the transient mode of transmission control 26. The supply air passes beyond valve 47 and is the air to locking device 88 via passage 99, FIG. 11, and neutral locking device 101 via passage 111, FIG. 12.

Figures 5, 13:
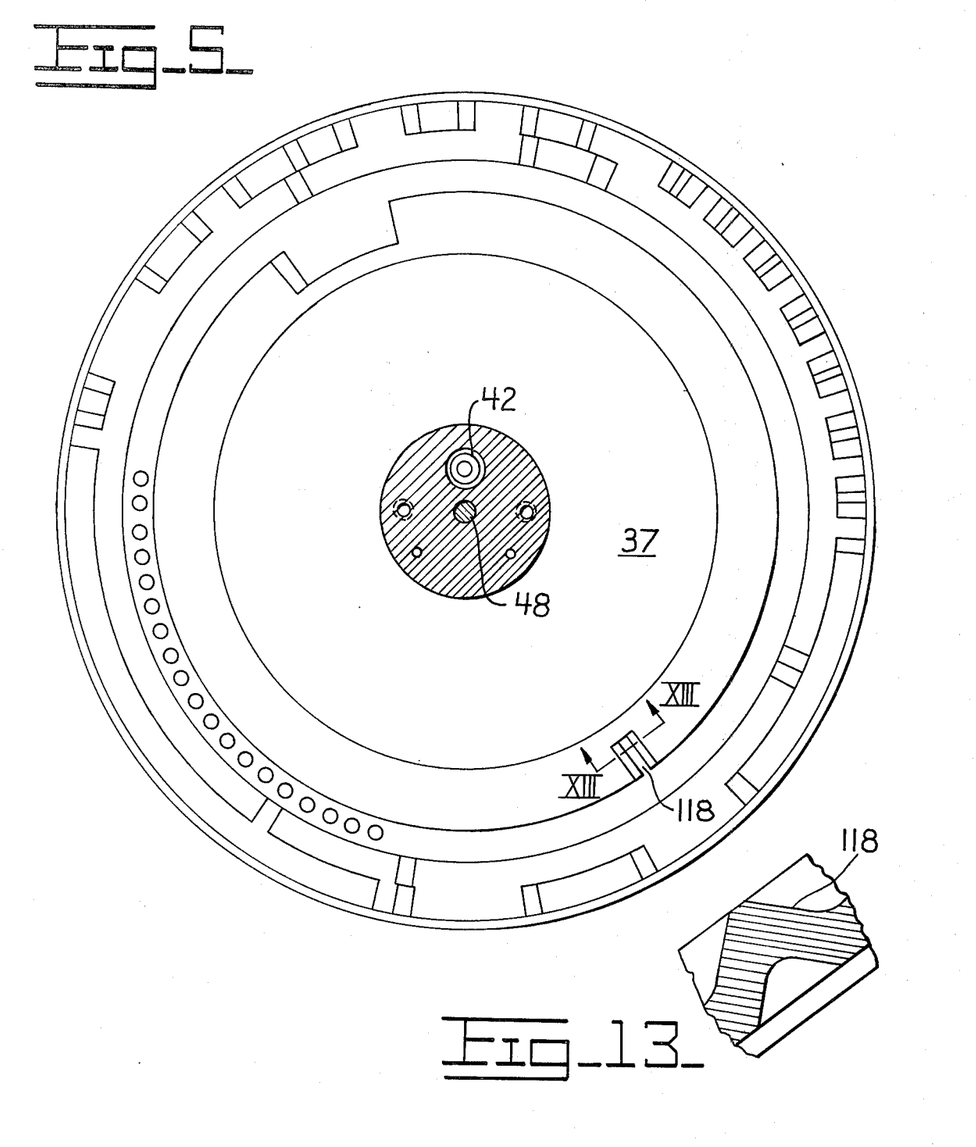
FIG. 13 is an enlarged fragmentary view taken along Section Line XIII—XIII of FIG. 5.
Figure 7:
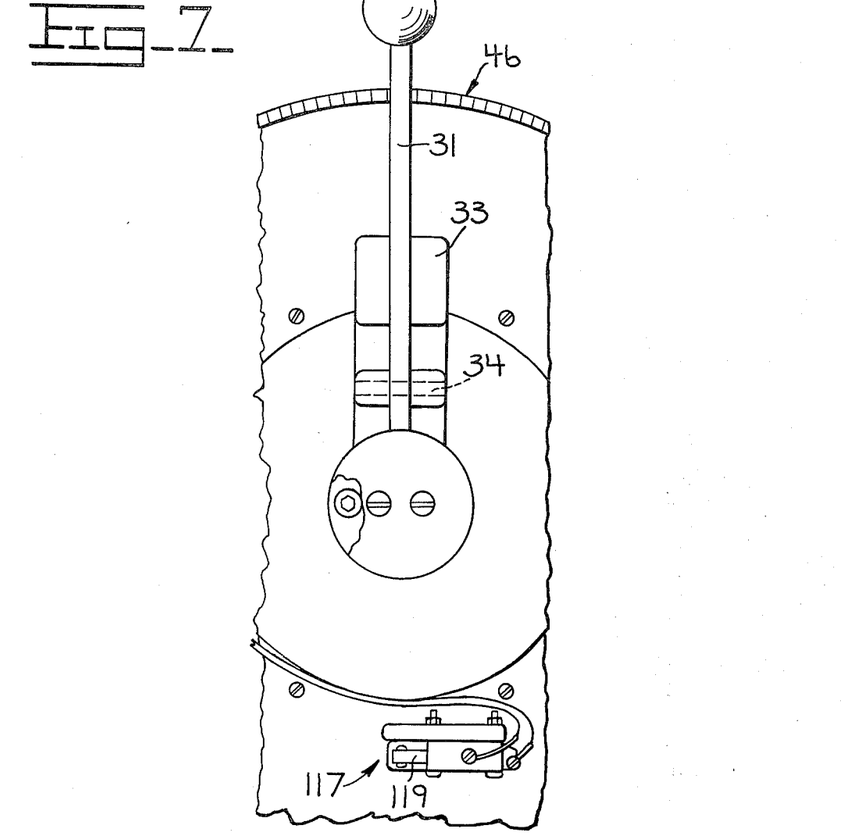

A safety starting mechanism is also provided by combined operation of the actuating cam plate 37 and a neutral start switch 117 as illustrated in FIGS. 3 and 7. Referring also to FIGS. 5 and 13, an actuating ramp is formed upon the actuating cam plate 37 at 118 for engagement with an actuating lever 119 of the switch 117. When the actuating cam plate 37 and the lever 31 are positioned in neutral, shifting of the lever 119 by the ramp 118 conditions the switch 117 to conventionally provide a closed electrical starting circuit for an engine represented by the flywheel 14 in FIG. 1.

What is claimed is:

1. A manually operable shift control mechanism for regulating a transmission control circuit responsive to a source of fluid pressure in order to selectively establish one of a plurality of speed ratios in the transmission, comprising a shift control housing, a shift control lever, means mounting said lever on said housing for angularly movement between a plurality of consecutively arranged settings respectively corresponding to the transmission speed ratios, additional means mounting said lever on said housing for pivotable movement transversely to said angular movement, an actuating plate being arranged for rotation with said lever, a plurality of valve means, each including respective actuating means supported by said shift control housing, respective arcuate portions of said actuating plate including means movable during angular movement of said lever for selective interaction between one of said actuating means to operate one of said valve means, said valve means being in fluid communication with the transmission control circuit to selectively establish one of the plurality of speed ratios in the transmission, a lock mechanism arranged for locking interaction with said actuating plate and responsive to fluid pressure in the transmission control circuit to prevent rotation of said actuating plate and lever during transient conditions within the transmission, the lock mechanism responding to operative pressurization in the control circuit for releasing said actuating plate, and a valve positioned adjacent said lever and engaged by a portion thereof when the same is pivoted in said transverse direction, said valve being in communication with said source of fluid pressure and communicating with said valve means and said lock mechanism to initiate fluid flow thereto.

2. A manually operated shift control responsive to a source of fluid pressure in order to selectively establish one of a plurality of speed ratios in the transmission, comprising a shift control housing, a shift control lever, means mounting said lever on said housing for angularly movement between a plurality of consecutively arranged settins respectively corresponding to the transmission speed ratios, additional means mounting said lever on said housing for pivotable movement transversely to said angular movement, an actuating plate being arranged for rotation with said lever, a plurality of valve means, each including respective actuating means supported by said shift control housing, respective arcuate portions of said actuating plate including means movable during angular movement of said lever for selective interaction between one of said actuating means to operate one of said valve means, said valve means being in fluid communication with the transmission control circuit to selectively establish one of the plurality of speed ratios in the transmission, a detent mechanism arranged for engagement with an arcuate portion of said actuating plate and tending to maintain said actuating plate in one of a plurality of positions corresponding to the plurality of speed ratios in the transmission, and a valve positioned adjacent said lever and engaged by a portion thereof when the same is pivoted in said transverse direction, said valve being in communication with said source of fluid pressure and communicating with said valve means and said detent mechanism to initiate fluid flow thereto.

3. A manually operable shift control mechanism for regulating a transmission control circuit responsive to a source of fluid pressure in order to selectively establish one of a plurality of speed ratios in the transmission, comprising a shift control housing, a shift control lever, means mounting said lever on said housing, for angularly movement between a plurality of consecutively arranged settings respectively corresponding to the transmission speed ratios, additional means mounting said lever in said housing for pivotable movement transversely to said angular movement, an actuating plate being arranged for rotation with said lever, a plurality of valve means, each including respective actuating means supported by said shift control housing, respective arcuate portions of said actuating plate including means movable during angular movement of said lever for selective interaction between one of said actuating means to operate one of said valve means, said valve means being in fluid communication with the transmission control circuit to selectively establish one of the plurality of speed ratios in the transmission, and a neutral locking mechanism arranged for locking interaction with said actuating plate to prevent movement of said actuating plate and said shift control lever out of a neutral position until actuating fluid pressure is developed in said transmission control circuit, and a valve positioned adjacent said lever and engaged by a portion thereof when the same is pivoted in said transverse direction, said valve being in communication with said source of fluid pressure and communicating with said valve means and said neutral locking mechanism to initiate fluid flow thereto.

4. The combination of claim 3 further including a safety start switch arranged relative to said housing for actuation by said actuating plate only when said actuating plate and shift control lever are positioned in neutral.

* * * * *